E. G. WATERS.
ELECTRIC PROTECTIVE SYSTEM.
APPLICATION FILED APR. 27, 1915.
1,152,362.
Patented Aug. 31, 1915.
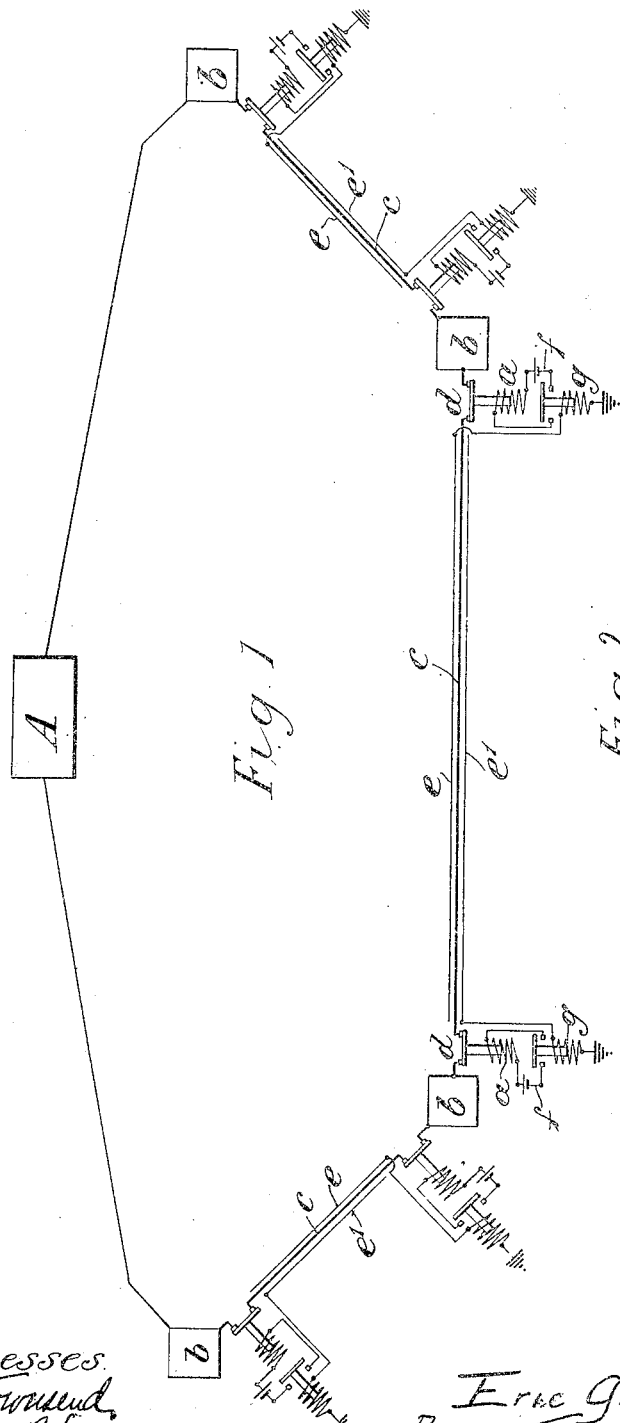
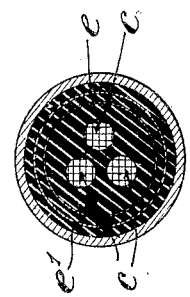
Witnesses
F. B. Townsend
Edwin Robinson
Inventor
Eric Gordon Waters
By Townsend & Decker
Attorneys.

UNITED STATES PATENT OFFICE.

ERIC GORDON WATERS, OF FOREST ROW, ENGLAND.

ELECTRIC PROTECTIVE SYSTEM.

1,152,362.  Specification of Letters Patent.  Patented Aug. 31, 1915.

Application filed April 27, 1915. Serial No. 24,378.

*To all whom it may concern:*

Be it known that I, ERIC GORDON WATERS, a subject of the King of Great Britain and Ireland, residing at Forest Row, in the county of Sussex, England, have invented Improvements in or Relating to Electric Protective Systems, of which the following is a specification.

This invention relates to the protection of electric systems formed in sections, or capable of being so divided, for instance, ring main systems.

It has been proposed in order automatically to cut out at one end faulty feeders employed in connection with a three-phase alternating current system in which the neutral point is earthed, to provide each feeder cable with a switch operable by leakage current traversing a trip coil, the latter being connected between an insulated sheath and earth. Such an arrangement if applied to electric systems formed in sections (for example ring main schemes in which faulty cables should be cut out at both ends) possesses this disadvantage that on the occurrence of a fault in one of the sections other sections would be liable to be cut out by extraneous current traversing the relay circuit.

The object of the present invention is to provide a convenient means of cutting out both ends of faulty cable sections free of the above disadvantage.

The invention consists in the provision in an electric protective system wherein cutting out of faulty sections is effected by fault current, of two separate protective conductors for each cable section, the respective protective conductors being in connection with tripping means at the ends of the cable section and disposed in proximity to the cable section.

In the accompanying drawings, Figure 1 is a diagrammatic view of a ring main system protected in accordance with the invention. Fig. 2 is a diagrammatic view representing in cross section one of the cable sections of such system.

In carrying the invention into effect in the form illustrated by way of example, two protective conductors $e$ $e^1$ constituted as earth shields, are provided for each section of a ring main including substations $b$ and mains $c$, each protective conductor being earthed by way of a relay $g$. Circuit breakers $d$ are provided and are arranged to be operated by suitable trip coils controlled by the relays, such trip coils being exemplified at $a$ as included in a local battery circuit $f$.

In operation when the whole system is working properly and the insulation of the desired part complete, no current other than possible static charging current can flow through the relays $g$ either from earth or from the cable. Should a fault occur on one section of the ring main, however, current flows from the generating station A around both limbs of the system, uniting at the fault and flowing to earth through the two protective conductors $e$ and $e^1$ and relays $g$. The arrangement is such that even in the case of a dead "earth" on the cable, that is a fault such that the resistance of the path from the fault to earth is very low, sufficient current will always flow through the conductors $e$ and $e^1$ and through the relays $g$ owing to the mutual induction effect of the fault current passing through the feeder cable or main and feeding the fault. The two relays of a faulty section are thus operated and the faulty section cut out.

It will be understood that none of the fault current passing to the generating station through earth can possibly traverse the relays of other sections because their circuits are not completed. For this reason perfect discrimination between faulty and healthy sections is insured.

The conductors $e$ and $e^1$ can be formed in any convenient way by suitable lead or other metallic coverings to be cabled, insulated from each other and from earth, as shown in Fig. 2, and divided at the various sub-stations. The invention need not necessarily be employed in connection with ring main systems but can be applied to any scheme in which sections are provided or can be used.

What I claim is:—

1. In an electrical distribution system comprising cable sections adapted to be discriminately cut out by fault current, the combination with each cable section of a switch at each end thereof, two separate protective conductors and two sets of switch tripping means, one such set of tripping means being associated with one of the protective conductors and the other set of tripping means being associated with the other protective conductor.

2. In an electrical distribution system comprising cable sections adapted to be discriminately cut out by fault current, the combination with each cable section and a switch at each end thereof, of two separate protective conductors disposed in proximity to the cable section, one such protective conductor being earthed and including a relay arranged near one end of the cable section and the other protective conductor being earthed and also including a relay arranged near the opposite end of the cable section, local circuits associated with such relays and trip coils in the local circuits adapted to operate the switches when a fault occurs, the fault current passing to earth from the cable section through the separate protective conductors and associated relays.

8. In an electrical distribution system comprising cable sections adapted to be discriminately cut out by fault current, the combination with each cable section and a switch at each end thereof, of two separate protective conductors insulated from each other and from the cable section, a relay connected to earth and to one end of one of such protective conductors, another relay connected to earth and to the opposite end of the other protective conductor and tripping means associated with the said relays and with the cable section switches.

Signed at London England this 16th day of April 1915.

ERIC GORDON WATERS.

Witness:
  B. J. BARKER